United States Patent [19]

Versleegers

[11] Patent Number: 5,422,869
[45] Date of Patent: Jun. 6, 1995

[54] DISC CHANGER WITH COMMON COMMAND ELEMENT FOR TURNTABLE AND DISC CARRIER

[75] Inventor: Jozef C. M. Versleegers, Hasselt, Belgium

[73] Assignee: U.S. Philips Corporation, New York, N.Y.

[21] Appl. No.: 949,653

[22] Filed: Sep. 23, 1992

[30] Foreign Application Priority Data

Dec. 20, 1991 [EP] European Pat. Off. ............ 91203367

[51] Int. Cl.$^6$ .............................................. G11B 17/22
[52] U.S. Cl. ................................... 369/37; 369/75.2; 369/266
[58] Field of Search ................... 369/36, 37, 75.1, 75.2, 369/266

[56] References Cited

U.S. PATENT DOCUMENTS

| | | | |
|---|---|---|---|
| 4,670,866 | 6/1987 | Hasegawa et al. | 369/36 |
| 5,146,451 | 9/1992 | Kang | 369/37 |
| 5,173,889 | 12/1992 | Nagahisa et al. | 369/37 |
| 5,197,056 | 3/1993 | Van Heusden et al. | 369/37 |

FOREIGN PATENT DOCUMENTS 0386708  3/1990  European Pat. Off. ............ 369/75.1
2187877  9/1987  United Kingdom .

OTHER PUBLICATIONS

"Cams Design, Dynamics, and Accuracy", by Harold A. Rothbart, pp. 308–323, published 1956.

*Primary Examiner*—Richard A. Bertsch
*Assistant Examiner*—Roland G. McAndrews, Jr.
*Attorney, Agent, or Firm*—David R. Treacy

[57] ABSTRACT

A disc player comprises an optical scanning device (13) with a turntable (17), which is rotatable about an axis of rotation (17a) and which has a supporting surface (17b) for supporting an information disc, and with a disc-shaped disc carrier (15), which is rotatable about an axis of rotation (15a) and which has carrying surfaces (51) for information discs. The disc player has a driving device comprising a command element (63) which is rotatable about an axis of rotation (63a) and which has first means for cooperation with guide means to guide the turntable between a play position and a rest position and second means for cooperation with the disc carrier to rotate the disc carrier between well-defined disc-carrier positions.

16 Claims, 2 Drawing Sheets

DISC CHANGER WITH COMMON COMMAND ELEMENT FOR TURNTABLE AND DISC CARRIER

BACKGROUND OF THE INVENTION

The invention relates to a disc player comprising a stationary frame, a scanning device for scanning information discs, in particular optical or magneto-optical disc-shaped record carriers, disc carrier, and a driving mechanism. The scanning device comprises a turntable which is rotatable about a first axis of rotation and which has a supporting surface for supporting an information disc. The disc carrier is disc-shaped and is rotatable about an axis and has carrying surfaces for information discs. The mechanism comprises driving a command element which is rotatable about a second axis of rotation and has a first device for cooperation with a guide structure for guiding the turntable between a first position, in which the supporting surface of the turntable extends at one side of the plane defined by all the carrying surfaces of the disc carrier, and a second position, in which the supporting surface extends at the other side of the plane defined by all the carrying surfaces; and a second device for cooperation with the disc carrier to rotate the disc carrier between two well-defined (that is, accurately defined) disc-carrier positions.

Such a disc player is known from GB-A 2,187,877 (herewith incorporated by reference). The known disc player has a housing with a drawer which is supported in a frame and can be slid into and out of the housing. The drawer has a disc carrier adapted to receive five optical discs. The drawer carries an electric motor for rotating the disc carrier and holding it in well-defined positions, microswitches being provided for the detection of these positions. The scanning device, which comprises an optical scanning element and a turntable, is secured in an element which is movable relative to the frame. The drawer is slid in and out by means of an electric motor which is arranged in the housing and is coupled to a toothed command disc. The command disc has a toothed ring for cooperation with a toothed rack of the drawer and further has a spiral groove which is engaged by a pin of the slide carrying said element. After the drawer has been slid into the housing the command disc is rotated to bring the turntable from a rest position to a play position.

A disc player of the type defined above requires a proper coordination between the rotary movements and positions of the disc carrier and the movements and positions of the turntable.

A disadvantage of the known disc player is that for rotating the disc carrier and moving the turntable two separate drives are needed. The presence of two drives with associated electric motors and transmission mechanisms requires additional space, which is often scarce in modem compact equipment. Moreover, dedicated electronic controls are needed for actuating one drive relative to the other drive at the correct instants in order to guarantee the appropriate positions of the disc carrier and the turntable relative to one another. Obtaining short access times is difficult as a result of the presence of two drives.

SUMMARY OF THE INVENTION

It is an object of the invention to provide a disc player which in a simple way provides an accurate mechanical interlock between the rotary movements of the disc carrier and the movements of the turntable and which enables short access times to be attained.

To this end the disc player in accordance with the invention is characterised in that the rotatable command element is a unitary element which comprises both the first device for cooperation with the guide structure for guiding the turntable and the second device for cooperation with the disc carrier that is, the command element surfaces forming the first device and second device are fixed with respect with each other, and move together as one element. In this disc player the disc carrier and the turntable are coupled via the command element, so that only one drive motor is needed for the coordinated drive of the disc carrier and the turntable.

An embodiment of the disc player in accordance with the invention is characterised in that the first device comprises a cam which is constantly in contact with a cam follower of the guide structure. This embodiment has the advantage that discontinuous movements of the turntable, and hence of the entire scanning device, are possible without lost motion.

An embodiment of the disc player in accordance with the invention is characterised in that the cam is a polygonal cam which has circular-arc cam surfaces and is arranged eccentrically on the command element, the cam being retained between two upright edges of the cam follower. In this embodiment the movements of the turntable are coupled to the rotary movements of the disc carrier in a constructionally attractive manner. The cam arranged between the two upright edges of the cam follower guarantees a coupling free of lost motion and hence silent and accurate periodic movements and accurate positions of the scanning device.

An embodiment of the disc player in accordance with the invention is characterised in that the second device comprises an eccentrically disposed journal on a pin which extends parallel to the second axis of rotation, the disc carrier having radially extending slots with which the journal engages by rotation of the command element in operation to rotate the disc carrier between said disc-carrier positions. The construction used in this embodiment is very suitable for the intermittent rotation of the disc carrier, the disc carrier being set into motion and stopped gradually, i.e. without impermissible acceleration and deceleration peaks. Moreover, as a result of the absence of large acceleration and deceleration forces the construction produces minimal noise during operation, which is obviously important for an audio and/or video apparatus. If the first-device embodiment employs a symmetrical cam, such as a triangular circular-arc cam, the command element can be driven in two directions of rotation for the coordinated rotation and displacement of the disc carrier and the turntable. This has the advantage that during operation, regardless of the starting position of the disc carrier, it is always possible to select that direction of rotation which yields the shortest access time.

An embodiment of the disc player in accordance with the invention, in which the second device also cooperates with the disc carrier to latch the disc carrier in said disc-holder positions, is characterised in that the second device comprises a latching element arranged diametrically opposite the journal and the disc carrier is formed with radial ridges bounding the slots, the latching element being engageable between every two adjacent slots by rotation of the command element in operation to latch the disc carrier in said disc-carrier positions. In this embodiment the disc carrier is accurately yet simply held in the disc-carrier positions dictated by the construction. In a practical embodiment the number of slots is equal to the number of carrying surfaces, for example five slots for five carrying surfaces, and the latching element is constituted by an arcuate latching projection.

An embodiment of the disc player in accordance with the invention, in which the command element is disc-shaped and has two parallel side walls, is characterised in that the cam is arranged on one of the side walls and the journal and the latching element are arranged on the other side wall. In this way a compact construction in layers is possible for the disc player.

An embodiment of the disc player in accordance with the invention is characterised in that the command element has a range of rotation in which the turntable is in a first position and engages a recess in one of the carrying surfaces of the stationary disc carrier, the supporting surface being spaced from the relevant carrying surface in a position suitable for supporting an information carrier. In the stationary positions of the command element which occur in said range of rotation the scanning device is in the play position, an information disc present on the turntable being clear of the disc carrier and being rotated with the turntable during rotation of the turntable to allow scanning without mechanical contact. Preferably, this embodiment is also characterised in that in operation as it performs a revolution the command element, starting from a stationary rotary position within said range of rotation, first moves the turntable from the first to the second position, then by rotating the disc carrier moves an adjacent carrying surface thereof above the turntable, and subsequently moves the turntable from the second to the first position while the disc carrier is stationary. In this embodiment the command element is utilised very efficiently and the turntable displacements are related to the disc-carrier rotations in a very reliable manner, the positions of the turntable and the disc carrier relative to one another during operation being well-defined at every instant.

It is to be noted that mechanisms for producing intermittent or periodic movements are known per se. Some mechanisms of this type are described in, for example, the book "Cams, Design, Dynamics, and Accuracy" by Harold A. Rothbart, 1956, John Wily & Sons, Inc. Reference is made in particular to § 11.10 "Circular arc cams—Constant-breadth follower", pp. 308–311 and § 11.15 "Comparison of intermittent-motion mechanisms", pp. 320–323 of said book.

An embodiment of the disc player in accordance with the invention, in which the disc player comprises a housing and the disc carrier is rotatably supported on a drawer which is movable between a slid-in position and a slid-out position, is characterised in that the scanning device and the driving mechanism with said command element are arranged on the drawer. This embodiment enables the disc carrier to be moved at least partly outside the housing while an information disc is being scanned. This makes it possible to exchange one or more discs without an interruption of the scanning process.

An embodiment of the disc player in accordance with the invention, in which the disc player comprises a drawer drive unit secured to the stationary frame, is characterised in that the drawer drive unit comprises a pivotable arm having one end which engages a groove formed in the drawer. This prevents the drawer from being subjected to abrupt accelerating forces, thereby guaranteeing smooth inward and outward movement of the drawer. In a practical embodiment the groove extends in a direction transverse to a direction of movement of the drawer.

An embodiment of the disc player in accordance with the invention is characterised in that the driving mechanism can be energised both in the slid-in position and in the slid-out position of the drawer. This embodiment has the advantage that after an information disc has been exchanged it can be scanned already before the drawer is slid into the housing. Preferably, this embodiment is provided with a "quick-play" button coupled to a microprocessor for an optimum use of the extremely short access time.

An embodiment of the disc player in accordance with the invention, in which the scanning device is secured to a supporting element which is movable along the first axis of rotation and which bears on inclined guide surfaces of a slide of said guide structure, which slide is movable transversely of the first axis of rotation, is characterised in that the slide is coupled to the first device of the command element. For constructional and space-saving reasons the slide is preferably movable in a direction oriented at an angle between 30 and 60 degrees relative to the normal to a front surface of the disc player.

The invention will now be described in more detail, by way of example, with reference to the drawings.

DESCRIPTION OF THE PREFERRED EMBODIMENT

Figure 1:
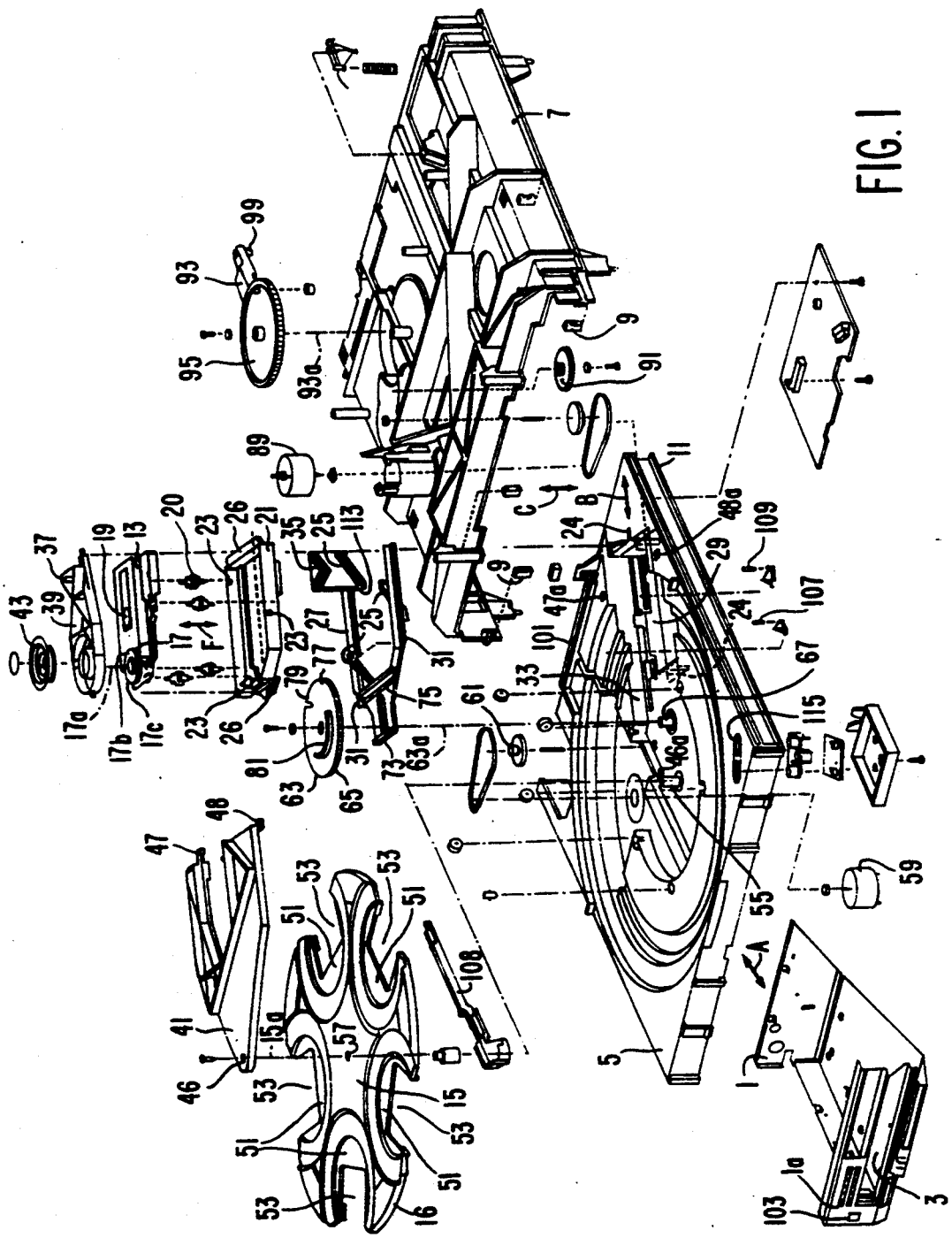
FIG. 1 is an exploded view of the disc player in accordance with the invention.

The disc player in accordance with the invention shown in FIG. 1 has a housing 1 comprising a front surface 1a formed with a slot 3 and a drawer 5 which can be slid into and out of the housing. The housing 1 accommodates a stationary frame 7 with guide elements 9 for guiding the drawer 5, which at opposite sides carries guide profiles 11 for cooperation with the guide elements 9. The drawer 5 is movable relative to the frame 7 in the directions indicated by the double arrow A, the drawer 5 being movable in a horizontal plane in the case that the disc player is installed in a horizontal position. In the present example the drawer 5 functions as a movable subframe carrying a scanning device 13 and a disc carrier 15.

The scanning device 13 comprises a turntable 17 which is rotatable about an axis of rotation 17a and which has a supporting surface 17b for supporting and a centering mandrel 17c for centring an optically scannable disc such as a CD, a photo-CD or a CDI. The turntable 17 is secured on a drive shaft of an electric motor, not shown in the drawings. The scanning device 13 further comprises an objective unit which is radially movable relative to the turntable 17 and which has an objective 19 which is movable in a focusing direction F.

The scanning device 19 is secured to a supporting member 21 by means of a plurality of elastic supporting elements 20, which supporting member comprises a plurality of, in the present case three, projections 23 which bear on an equal number of inclined guide surfaces 25 of a slide 27. The slide 27, which is arranged in a longitudinal opening 29 in the drawer 5, is horizontally movable to a limited extent in a direction indicated by the double arrow B, which in the present example is oriented at an angle of 36° relative to the arrow A. The slide 27 comprises guide strips 31 for cooperation with guide portions 33 of the drawer 5. When the slide 27 is moved in the direction indicated by the arrow B the supporting member 21, as a result of the cooperation between the projections 23 and the inclined guide surfaces 25 and the cooperation between the guide elements 24 and the guide grooves 26 of the supporting member 21, performs corresponding vertical movements as indicated by the double arrow C in order to move the turntable 17 along the axis of rotation 17a between a first position and a second position. In the present embodiment the first position corresponds to the play position of the turntable, i.e. the position in which the supporting surface 17b can support an optical disc, and the second position corresponds to the position of the turntable in which this is not possible.

The slide 27 has a guide surface 35 for cooperation with a guide pin 37 of a tilting element 39. The tilting element 39 forms part of a disc-pressure means which comprises a bracket 41 and a pressure member 43 which can be pressed against the turntable 17 by magnetic force. The bracket 41 is secured to the drawer 5 at three points 46, 47 and 48 i.e. at the location of the portions 46a, 47a and 48a. By means of a pin the tilting element 39 is pivotably mounted on the bracket 41. The pressure member 43 can be moved towards and away from the turntable by moving the slide 27 in the directions indicated by the arrow B.

The disc carrier 15, which is disc-shaped, is rotatable about an axis of rotation 15a and has a plurality of, in the present example five substantially co-planar, carrying surfaces 51 with recesses 53 extending up to the circumference 16 of the disc carrier. The disc carrier 15 is supported by means of a cylindrical bearing pin 55 arranged on the drawer 5 and engaging a corresponding central opening 57 in the disc carrier. The disc carrier 15 has five well-defined positions, hereinafter referred to as disc-carrier positions, in which always one of the carrying surfaces 51 is in a coaxial position relative to the turntable 17. The recesses 53 are dimensioned in such a way that in the disc-carrier positions the turntable 15 is movable through one of the recesses 53 between the first position (the play position), in which the supporting surface 17b is situated above one of the carrying surfaces 51, and the second position—the rest or pause position—, in which the supporting surface is situated at a lower level than the plane defined by all the carrying surfaces 51.

Figure 3:
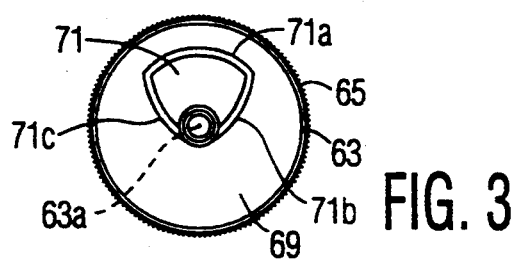
FIG. 3 is an underneath view of a command element.

The disc player in accordance with the invention further comprises a driving mechanism for rotating the disc carrier 15 between the different disc-carrier positions and for moving the turntable 17 between the first and the second position. The driving device comprises an electric motor 59, which drives a disc-shaped command element 63 via a transmission mechanism comprising inter alia a pinion 61, which pinion 61 is in mesh with a toothed ring 65 of the command element 63. The command element 63, which is rotatable about an axis of rotation 63a, is a unitary element which is journalled on a bearing pin 67 of the drawer 5. On a first side wall 69 (FIG. 3) the command element 63 carries a polygonal cam 71 which is disposed eccentrically on the command element 63 and comprises a plurality of, in the present example three, circular-arc cam surfaces 71a, 71b and 71c. The command element 63 and the slide 27 are positioned in such a way relative to one another that the cam 71 extends between upright parallel edges or walls 73 and 75 of the slide 27 which form a cam follower. The distance between the two edges 73 and 75 is such that in any position the cam 71 is in contact with both edges, so that an accurate coupling without lost motion is obtained between the command element 63 and the slide 27. During one full revolution of the command element 63 the slide 27 successively performs a movement in a direction as indicated by the arrow B and an oppositely directed movement, the movements being separated by a break.

Figure 2:
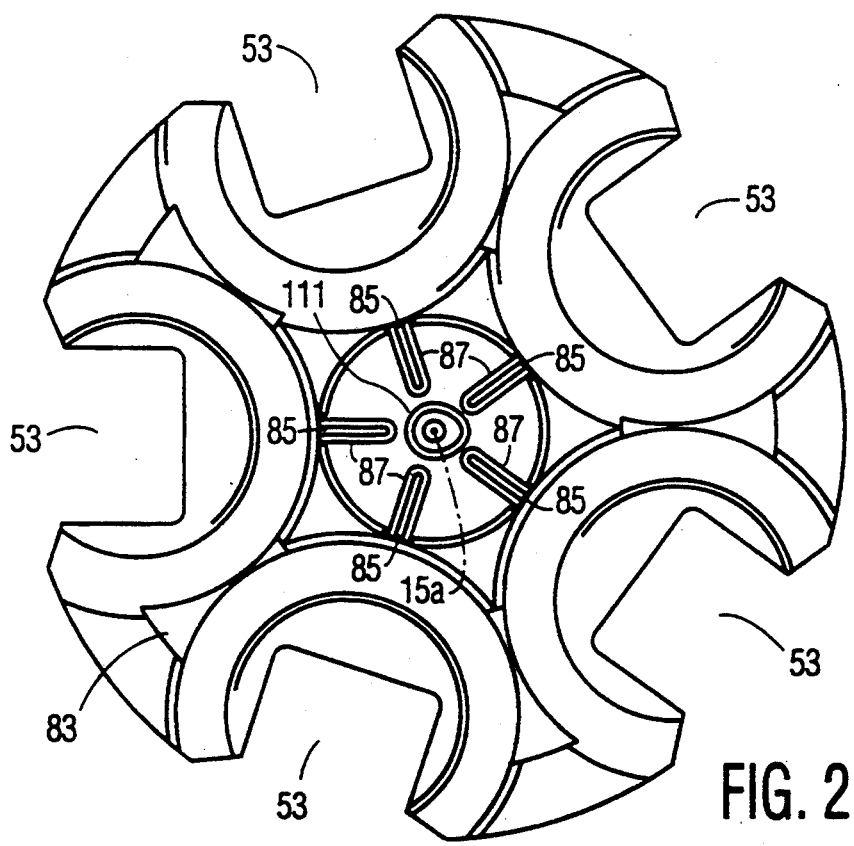
FIG. 2 is an underneath view of a disc carrier of the disc player shown in FIG. 1.

On a second side wall 77, which extends parallel to the first side wall, the command element 63 comprises an eccentrically disposed journal pin 79, which extends parallel to the axis of rotation 63a, and a latching collar 81 for cooperation with the disc carrier 15, which collar is situated diametrically opposite the journal pin 79. For this purpose the disc carrier 15 has a plurality of, in the present example five, radial slots 85 and ribs or ridges 87 on one of its sides, in the present example the underside 83 (FIG. 2). The command element 63 and the disc carrier 15 are arranged in such a way relative to one another that the journal pin 79 engages one of the slots 85 during a part of the rotation of the command element 63, causing the disc carrier to be rotated through 72° from a given disc-carrier position to a new disc-carrier position, the latching collar 81 engaging between two ridges 87 during another part of the rotation in order to lock the disc carrier against rotation in the resulting disc-carrier position. This combination of pin and slot, and latching element, form a Geneva mechanism.

In the disc player in accordance with the invention the disc carrier 15 and the turntable 17 are movably coupled to one another by means of the command element 63. By means of only one drive motor 59 it is thus possible to drive both the disc carrier 15 and the turntable 17 in such a way that well-defined locations of the disc carrier 15 and the turntable 17 are guaranteed in each rotor position of the command element 63. In the disc player shown herein the command element 63 has one range of rotational positions in which the disc carrier 15 is in one of the disc-carrier positions and the turntable 17 is in the play position and is situated in the recess 53 in one of the carrying surfaces 51.

Figure 4:
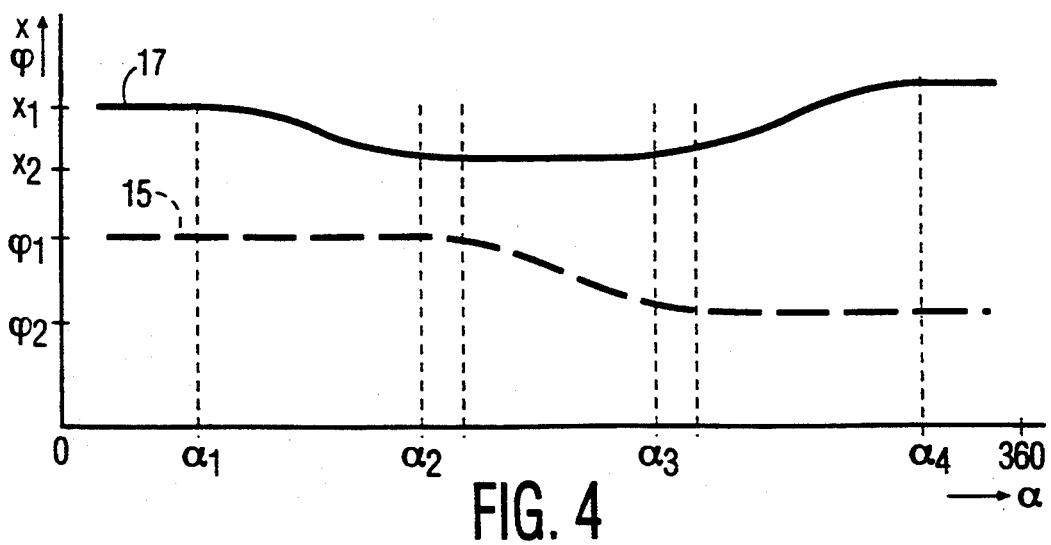
FIG. 4 is a graph illustrating the relationship between the movements of three constructional elements of the disc player shown in FIG. 1.

The diagram shown in FIG. 4 illustrates the translation ($x$) of the turntable 17 (continuous line) and the rotation ($\phi$) of the disc carrier 15 (broken line) in one revolution ($\alpha$) of the command element 63. Upon a rotation of the command element in the clockwise or counter-clockwise direction, starting from one of the rotational positions $\alpha_1$ of the above-mentioned range, which position may be regarded as a reference position for the command element 63, the electric motor 59 is energised and first brings the turntable 17 and, consequently, the entire scanning device 13 from the first position $x_1$ to the second position $x_2$, the disc carrier 15 being unlatched. After the turntable 17 has substantially reached the second position, the command element 63 being in the rotational position $\alpha_2$, the disc carrier 15 is rotated from a disc-carrier position $\phi_1$ until substantially a new disc-carrier position $\phi_2$ is reached, in which the command element occupies position $\alpha_3$. After the new disc-carrier position $\phi_2$ has been reached the disc carrier 15 is latched again and the turntable 17, and hence the entire scanning device 13, is moved from the second position $x_2$ to the first position $x_1$. The command element is then in the rotational position $\alpha_4$. In the range of rotation between $\alpha_4$ and $\alpha_1$ the turntable 17 remains in the play position $x_1$ and the disc carrier remains in the position $\phi_2$. The disc player shown enables short access times of, for example, 1 to 2 seconds to be obtained.

The disc player in accordance with the invention comprises a drawer drive unit which is secured to the stationary frame 7 and which comprises an electric motor 89, a transmission mechanism with inter alia a pinion 91, and a pivotable arm 93. The pivotable arm 93 is secured to a toothed wheel 95, which is rotatable about a pin 97 of the frame 7 and which meshes with the pinion 91. The pivotable arm 93 has a pin-shaped projection 99 which engages a groove 101 formed in the drawer 5, which groove extends in a direction transverse to the direction of movement A of the drawer 5. When the electric motor 89 is energised the arm 93 is pivoted about a pivotal axis 93a in order to provide a smooth movement of the drawer 5 as indicated by the arrow A. The electric motor 89 is started by actuating a button 103 at the front 1a of the housing 1. When the drawer 5 moves inward a switch 105 detects the end position, after which the electrode motor 89 is switched off.

The drawer 5 is provided with two detector switches 105 and 107 (FIG. 1). The detector switch 107 serves for detecting a reference position of the disc carrier 15 and by means of a switching slide 108 it cooperates with a cam profile 111 (FIG. 2) of the disc carrier 15. This reference position is necessary for determining by means of a microprocessor how many revolutions of the command element 63 are needed to reach a desired disc-carrier position. The detector switch 109 can be actuated by an actuating projection 113 of the slide 27 and serves for switching off the electric motor 59 after the turntable 17 has reached the play position by rotation of the command element 63.

The electric motor 59 and the process of scanning an information disc present on the turntable can be started by pressing control buttons at the front 1a of the housing 1. In addition, the disc player in accordance with the invention comprises a "quick-play" button 115 arranged on the drawer 5. By means of the button 115 the electric motor 59 can be started in the slid-out position of the drawer 5, which enables a particularly short access time to be obtained.

It is to be noted that the invention is not limited to the embodiment shown herein. For example, some features of the invention can be used without the disc player having a drawer. Moreover, the disc carrier may have more than or less than five carrying surfaces.

I claim:

1. A disc player comprising
   a stationary frame,
   a scanning device for scanning information discs, comprising a turntable which is rotatable about a first axis of rotation, said turntable having a supporting surface for supporting an information disc,
   a disc carrier having a plurality of substantially coplanar carrying surfaces spaced about a carrier axis, said carrying surfaces defining a carrier plane, means for mounting said disc carrier for rotation about said carrier axis, and means for enabling rotation of said disc carrier,
   guide means for guiding the turntable for relative movement with respect to the disc carrier between a first position in which said supporting surface is disposed to one side of said carrier plane, and a second position in which said supporting surface is disposed to the other side of said carrier plane,
   a driving mechanism comprising a command element which is rotatable about a second axis of rotation, said command element including first means for engaging said guide means to move the turntable between said first and second positions, and
   second means for engaging said means for enabling, to rotate the disc carrier between two accurately defined disc carrier positions,
   characterised in that said command element is a unitary, element comprising both said first means and said second means.

2. A disc player as claimed in claim 1, characterised in that said second means comprises an eccentrically disposed journal extending parallel to and spaced from the second axis of rotation, and
   said disc carrier has a number of radially extending slots arranged for respective engagement by said journal upon rotation of the command element during operation to rotate the disc carrier between said disc carrier positions, said number of slots being equal to the number of carrying surfaces of the disc carrier.

3. A disc player as claimed in claim 1, characterised in that the command element has a range of rotation in which the disc carrier is stationary, and the turntable is in a first position and is disposed in a recess in one of the carrying surfaces, said supporting surface being spaced from the respective carrying surface in a position for supporting an information carrier free from said respective carrying surface.

4. A disc player as claimed in claim 3, characterised in that in operation as it performs a revolution the command element, starting from a stationary rotary position within said range of rotation, first moves the turntable from the first to the second position, then by rotating the disc carrier moves an adjacent carrying surface thereof above the turntable, and subsequently moves the turntable from the second to the first position while the disc carrier is stationary.

5. A disc player as claim 1, in which the scanning device is secured to a supporting element which is movable along the first axis of rotation and which bears on inclined guide surfaces of a slide of said guide means, which slide is movable transversely of the first axis of rotation, characterised in that the slide is coupled to the first means of the command element.

6. A disc player as claimed in claim 5, characterised in that the slide is movable in a direction oriented at an angle relative to the normal to a front surface of the disc player, which angle is between 30 and 60 degrees.

7. A disc player as claim 1, characterised in that the first means comprise a cam which is constantly in contact with a cam follower of said guide means.

8. A disc player as claimed in claim 7, characterised in that the cam is a polygonal cam which has circular-arc cam surfaces and is arranged eccentrically on the command element, the cam being retained between two upright edges of the cam follower.

9. A disc player as claim 1, 2 or 8, characterised in that the second means comprise an eccentrically disposed journal which extends parallel to and spaced from the second axis of rotation, the disc carrier having radially extending slots with which the journal engages by rotation of the command element in operation to rotate the disc carrier between said disc-carrier positions.

10. A disc player as claimed in claim 9, in which the second means also cooperate with the disc carrier to latch the disc carrier in said disc-carrier positions, characterised in that the second means comprise a latching element arranged diametrically opposite the journal and the disc carrier is formed with radial ridges bounding the slots, the latching element being engageable between every two adjacent slots by rotation of the command element in operation to latch the disc carrier in said disc-carrier positions.

11. A disc player as claim 1, in which the disc player comprises a housing and the disc carrier is rotatably supported on a drawer which is movable between a slid-in position and a slid-out position, characterised in that the scanning device and the driving device with said command element are arranged on the drawer.

12. A disc player as claimed in claim 11, characterised in that the driving device can be energised both in the slid-in position and in the slid-out position of the drawer.

13. A disc player as claimed in claim 11, in which the disc player comprises a drawer drive unit secured in the stationary frame, characterised in that the drawer drive unit comprises a pivotable arm having one end which engages a groove formed in the drawer.

14. A disc player as claimed in claim 13, characterised in that the groove extends in a direction transverse to a direction of movement of the drawer.

15. A disc player comprising
a stationary frame,
a scanning device for scanning information discs, comprising a turntable which is rotatable about a first axis of rotation, said turntable having a supporting surface for supporting an information disc,
a disc carrier having a plurality of substantially coplaner planar carrying surfaces spaced about a carrier axis, said carrying surfaces defining a carrier plane,
means for mounting said disc carrier for rotation about said carrier axis, and means for enabling rotation of said disc carrier,
guide means for guiding the turntable for relative movement with respect to the disc carrier between a first position in which said supporting surface is disposed to one side of said carrier plane, and a second position in which said supporting surface is disposed to the other side of said carrier plane,
a driving mechanism comprising a command element which is rotatable about a second axis of rotation, said command element including first means for engaging said guide means to move the turntable between said first and second positions, and
second means for engaging said means for enabling, to rotate the disc carrier between two accurately defined disc carrier positions,
characterised in that said command element is a disc-shaped unitary element having two side walls,
said guide means comprises a cam follower,
said first means comprises a cam, arranged on one of said side walls, said cam being constantly in contact with said cam follower,
said second means comprises an eccentrically disposed journal extending parallel to and spaced from the second axis of rotation, and a latching element arranged diametrically opposite said journal, said journal and latching element being arranged on the other of said side walls,
said disc carrier has a number of radially extending slots arranged for respective engagement by said journal upon rotation of the command element during operation to rotate the disc carrier between said disc carrier positions, said number of slots being equal to the number of carrying surfaces of the disc carrier, and radial ridges bounding said slots, said latching element being engageable between a respective pair of adjacent slots to latch the disc carrier respectively in each of said accurately defined disc-carrier positions.

16. A disc player as claimed in claim 15, characterised in that the command element has a range of rotation in which the disc carrier is stationary, and the turntable is in a first position and is disposed in a recess in one of the carrying surfaces, said supporting surface being spaced from the respective carrying surface in a position for supporting an information carrier free from said respective carrying surface, and
starting from a stationary rotary position within said range of rotation, during operation as the command element performs one revolution, said command element first moves the turntable from the first to the second position, then by rotating the disc carrier moves an adjacent carrying surface to a position above the turntable, and subsequently moves the turntable from the second to the first position while the disc carrier is stationary.

* * * * *